(12) United States Patent
Li

(10) Patent No.: US 12,273,951 B2
(45) Date of Patent: Apr. 8, 2025

(54) METHOD AND APPARATUS FOR DETERMINING ACTIVATION MOMENT OF SCHEDULED CARRIER, AND DEVICE AND MEDIUM

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 399 days.

(21) Appl. No.: 17/775,255

(22) PCT Filed: Nov. 7, 2019

(86) PCT No.: PCT/CN2019/116407
§ 371 (c)(1),
(2) Date: May 6, 2022

(87) PCT Pub. No.: WO2021/087914
PCT Pub. Date: May 14, 2021

(65) Prior Publication Data
US 2022/0394811 A1    Dec. 8, 2022

(51) Int. Cl.
*H04W 76/00* (2018.01)
*H04W 76/28* (2018.01)
*H04W 52/02* (2009.01)

(52) U.S. Cl.
CPC ........ *H04W 76/28* (2018.02); *H04W 52/0216* (2013.01)

(58) Field of Classification Search
None
See application file for complete search history.

(56) References Cited

U.S. PATENT DOCUMENTS

| 10,375,685 B2 | 8/2019 | Ryu et al. | |
| 11,523,457 B2* | 12/2022 | He | H04W 52/0229 |
| 2009/0232118 A1* | 9/2009 | Wang | H04W 52/0216 370/352 |
| 2011/0002281 A1 | 1/2011 | Terry et al. | |
| 2011/0294491 A1 | 12/2011 | Fong et al. | |

(Continued)

FOREIGN PATENT DOCUMENTS

| CN | 101421997 A | 4/2009 |
| CN | 102461320 A | 5/2012 |

(Continued)

OTHER PUBLICATIONS

International Search Report of PCT/CN2019/116407 dated Jul. 29, 2020 with English translation, (4p).

(Continued)

*Primary Examiner* — Brandon M Renner
(74) *Attorney, Agent, or Firm* — Arch & Lake LLP; Hao Tan; Shen Wang

(57) ABSTRACT

Disclosed are a method and apparatus for determining active time of a scheduled carrier, and a communication device and a storage medium. The method includes: determining, by a communication device, in a cross-carrier scheduling scenario, whether a current moment is the active time of the scheduled carrier of a terminal according to a first discontinuous reception (DRX) group to which a scheduling carrier of the terminal belongs.

7 Claims, 5 Drawing Sheets

(56) References Cited

U.S. PATENT DOCUMENTS

| | | | |
|---|---|---|---|
| 2012/0320769 A1 | 12/2012 | Callender | |
| 2014/0029459 A1 | 1/2014 | Kwon et al. | |
| 2017/0202052 A1* | 7/2017 | Xu | H04W 76/28 |
| 2018/0049268 A1* | 2/2018 | Tenny | H04W 52/0216 |
| 2018/0139772 A1 | 5/2018 | Ozturk et al. | |
| 2018/0213512 A1 | 7/2018 | Ryu et al. | |
| 2020/0045768 A1* | 2/2020 | He | H04W 52/0229 |
| 2020/0245395 A1* | 7/2020 | Zhang | H04W 76/19 |

FOREIGN PATENT DOCUMENTS

| | | | | |
|---|---|---|---|---|
| CN | 105142238 A | 12/2015 | | |
| CN | 107182027 A | 9/2017 | | |
| CN | 107645765 A | 1/2018 | | |
| CN | 109937607 A | 6/2019 | | |
| CN | 110226350 A | 9/2019 | | |
| CN | 110945921 A * | 3/2020 | | H04W 52/0216 |
| WO | 2010078365 A1 | 7/2010 | | |
| WO | 2015184957 A1 | 12/2015 | | |
| WO | 2017164667 A1 | 9/2017 | | |
| WO | WO-2017148214 A1 * | 9/2017 | | H04W 56/00 |
| WO | 2018208956 A1 | 11/2018 | | |
| WO | 2018228531 A1 | 12/2018 | | |
| WO | 2019062792 A1 | 4/2019 | | |

OTHER PUBLICATIONS

Huawei, et al., "Cross-carrier scheduling design for TDD inter-band CA with different UL-DL configurations", 3GPP TSG RAN WG1 meeting #68bis, R1-120972, Jeju, Korea, Mar. 26-30, 2012, (7p).

CNOA issued in Application No. 201980002850.6 dated Jul. 28, 2023 with English translation, (5p).

The Second CNOA issued in Application No. 201980002850.6 dated Feb. 28, 2023 with English translation, (20p).

Ericsson, "DRX with Carrier Aggregation in LTE-Advanced," 3GPP TSG-RAN WG2, Meeting #66, R2-092959, San Francisco, USA, May 4-8, 2009, (3p).

Fang-Chen Cheng, CATT, "Study on UE Power Saving in NR," 3GPP TSG RAN, Meeting #83, RP-190297, Shenzhen, China, Mar. 18-21, 2018, (30p).

Fang-Chen Cheng, CATT, "Study on UE Power Saving in NR," 3GPP TSG RAN, Meeting #83, RP-190630, Shenzhen, China, Mar. 18-21, 2018, (30p).

First Office Action issued to Chinese Application No. 201980002850.6 dated Aug. 12, 2022 with English translation, (24p).

Mediatek, Inc., "DRX Configuration for NR" 3GPP TSG-RAN WG2 #98, R2-1704944, Hangzhou, China, May 15-19, 2017, (3p).

* cited by examiner

Determining, in a cross-carrier scheduling scenario, whether a current moment is the active time of the scheduled carrier of a terminal according to a first DRX group to which a scheduling carrier of the terminal — S110

METHOD AND APPARATUS FOR DETERMINING ACTIVATION MOMENT OF SCHEDULED CARRIER, AND DEVICE AND MEDIUM

CROSS-REFERENCE TO RELATED APPLICATION

The present application is a U.S. National phase application of International Application No. PCT/CN2019/116407, filed on Nov. 7, 2019, the entire content of which is incorporated herein by reference for all purposes.

TECHNICAL FIELD

The present application relates to the field of wireless communication but are not limited to the field of wireless communication, and in particular to a method and apparatus for determining active time of a scheduled carrier, a communication device and a storage medium.

BACKGROUND

Under a Discontinuous Reception (DRX) mechanism in a connected state, a DRX cycle is configured for a terminal. FIG. 1 shows a schematic diagram of the DRX cycle. It can be seen that the DRX cycle includes active time 'On Duration' and inactive time 'Opportunity for DRX'. During the active time, the corresponding DRX group is in an active state and can be used to send and receive information on the corresponding carrier. During the inactive time, the corresponding DRX group is in a sleep state. When there is a DRX group in the sleep state, the power consumption of the terminal is lower than the power consumption without DRX group in the sleep state.

For example, a DRX group in an active state of a terminal can monitor a Physical Downlink Control Channel (PDCCH) on a corresponding carrier, thereby receiving PDCCH signaling. The PDCCH signaling here may include Downlink Control Information (DCI).

SUMMARY

The present application provides a method and apparatus for determining active time of a scheduled carrier, a communication device and a storage medium.

According to a first aspect of the present application, there is provided a method for determining active time of a scheduled carrier. The method includes: determining, by a communication device in a cross-carrier scheduling scenario, whether a current moment is the active time of the scheduled carrier of a terminal according to a first DRX group to which a scheduling carrier of the terminal belongs.

According to a second aspect of the present application, there is provided a communication device. The communication device includes a transceiver, a memory, and a processor connected to the transceiver and the memory, respectively. The processor is configured to control the transceiver to send and receive wireless signals by executing computer-executable instructions stored on the memory, and capable of implementing the method for determining the active time of the scheduled carrier provided by the first aspect.

DETAILED DESCRIPTION

Figure 1:
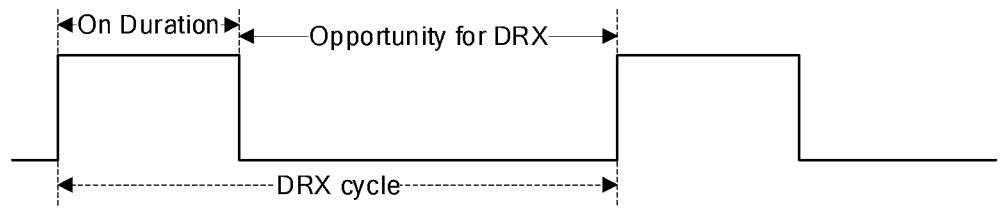
FIG. 1 illustrates a schematic diagram of a DRX cycle.

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 2:
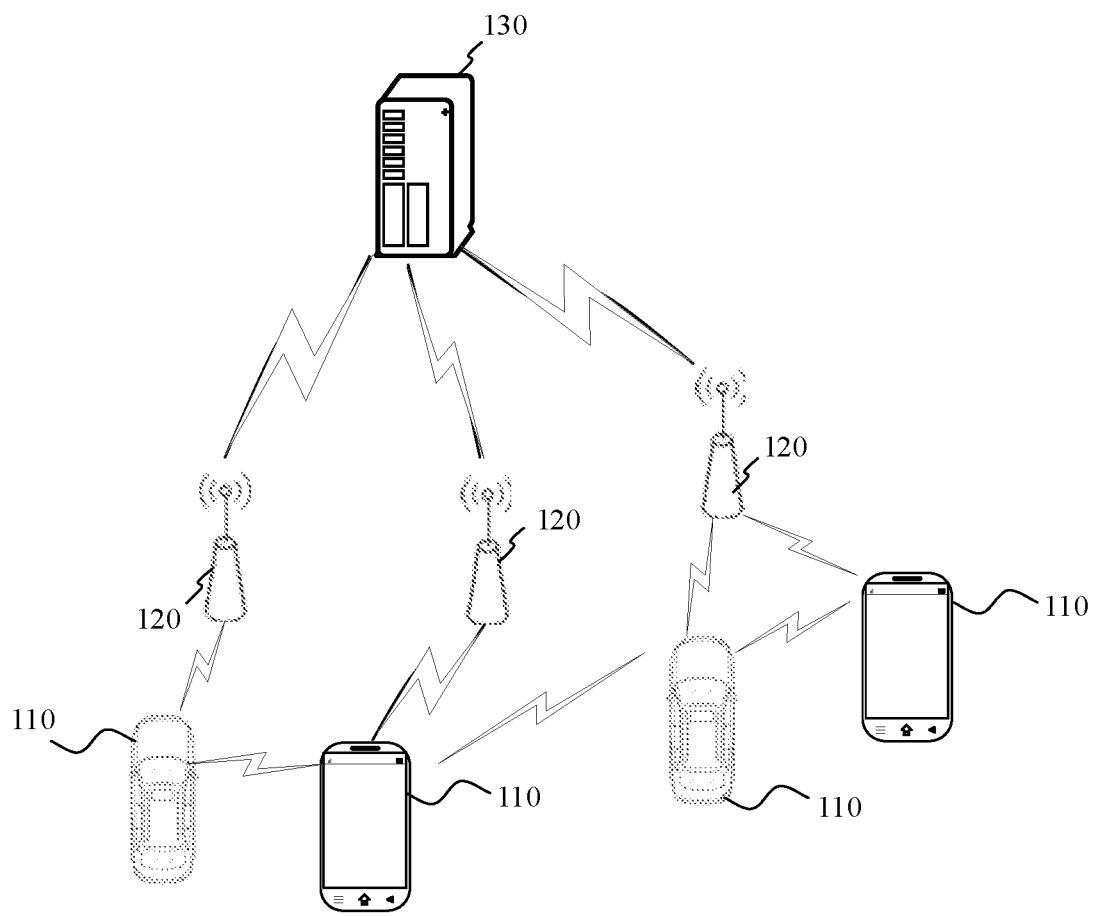
FIG. 2 illustrates a structural schematic diagram of a wireless communication system.

With reference to FIG. 2, it illustrates a structural schematic diagram of a wireless communication system provided by examples of the present application. As shown in FIG. 2, the wireless communication system is a communication system based on cellular mobile communication technology, and the wireless communication system may include: a plurality of base stations 110 and a plurality of terminals 120.

The terminal 110 may be a device that provides voice and/or data connectivity to a user. The terminal 110 may communicate with one or more core networks via a Radio Access Network (RAN). The terminal 110 may be an IoT terminal, such as a sensor device, a cell phone (or "cellular" phone), and a computer with an IoT terminal, e.g., it may be stationary, portable, pocket-sized, handheld, computer-built, or vehicle-mounted devices. For example, the terminal 110 may a station (STA), subscriber unit, subscriber station, mobile station, mobile platform, remote station, access point, remote terminal, access terminal, user terminal, user agent, user device, or user equipment. Alternatively, the terminal 110 may be an unmanned aerial vehicle device. Alternatively, the terminal 110 may be an in-vehicle device, for example, a trip computer with a wireless communication function, or a wireless terminal external to the trip computer. Alternatively, the terminal 110 may be a roadside device, for example, it may be a street light, a signal light, or other roadside device with a wireless communication function, etc.

The base station 120 may be a network side device in a wireless communication system. The wireless communication system may be a $4^{th}$ generation mobile communication (4G) system, also known as a Long Term Evolution (LTE) system. Alternatively, the wireless communication system may be a 5G system, also known as a new radio (NR) system or 5G NR system. Alternatively, the wireless communication system may be a further next generation system of the 5G system. The access network in the 5G system can be called New Generation-Radio Access Network (NG-RAN).

The base station 120 may be an evolved base station (eNB) employed in the 4G system. Alternatively, the base station 120 may be a base station (gNB) with a centralized distributed architecture employed in the 5G system. When the base station 120 adopts a centralized distributed architecture, it usually includes a central unit (CU) and at least two distributed units (DUs). The central unit is equipped with the protocol stack of Packet Data Convergence Protocol (PDCP) layer, Radio Link Control (RLC) layer, and Media Access Control (MAC) layer. The distributed unit is equipped with the protocol stack of physical (PHY) layer. The specific implementation of the base station 120 is not limited in the examples of the present application.

A wireless connection may be established between the base station 120 and the terminal 110 via a wireless air interface. In various implementations, the wireless air interface may be a wireless air interface based on the fourth generation mobile communication network technology (4G) standard, or may be a wireless air interface based on a fifth generation mobile communication network technology (5G) standard, such as a new radio (NR), or may be a wireless air interface based on a further next generation mobile communication network technology standard of 5G.

In some examples, End to End (E2E) connections may be established between terminals 110, e.g., vehicle to vehicle (V2V) communication, vehicle to infrastructure (V2I) communication, and vehicle to pedestrian (V2P) communication etc. in vehicle to everything (V2X) communication scenarios.

In some examples, the above wireless communication system may also include a network management device 130.

A number of base stations 120 are each connected to a network management device 130. The network management device 130 may be a core network device in the wireless communication system. For example, the network management device 130 may be a Mobility Management Entity (MME) in an Evolved Packet Core (EPC) network, or may be other core network devices, such as a Serving GateWay (SGW), Public Data Network Gate Way (PGW), Policy and Charging Rules Function (PCRF), or Home Subscriber Server (HSS), etc. The implementation form of the network management device 130 is not limited by the examples of the present application.

Figures 3, 4:
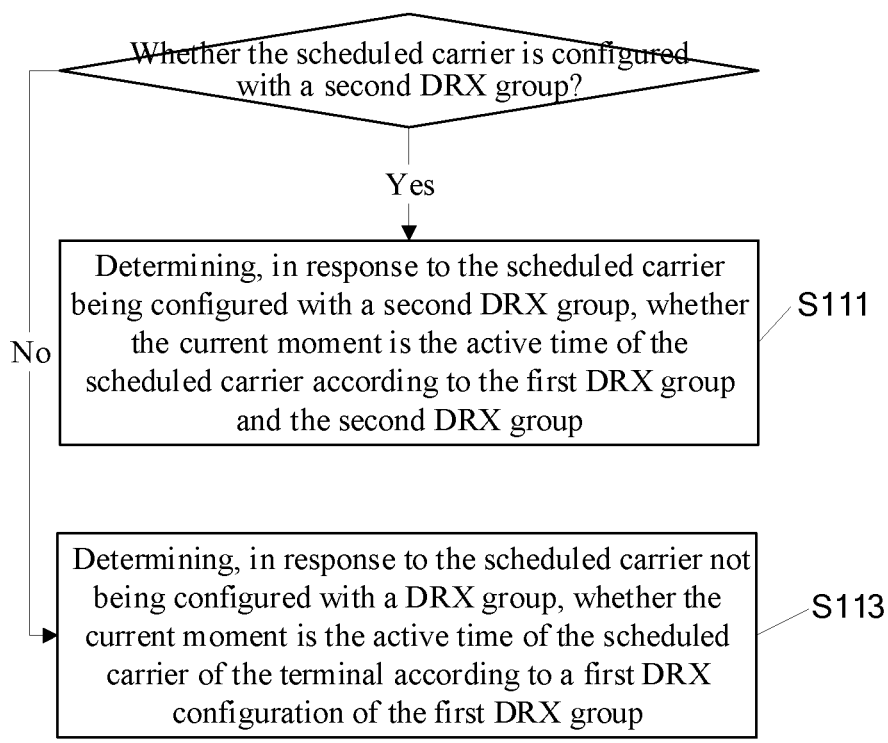
FIG. 3 illustrates a flow diagram of a method for determining active time of a scheduled carrier provided by one or more examples of the present application.
FIG. 4 illustrates a flow diagram of a method for determining active time of a scheduled carrier provided by one or more examples of the present application.

As shown in FIG. 3, an example of the present application provides a method for determining active time of a scheduled carrier, including S110, i.e., determining, in a cross-carrier scheduling scenario, whether a current moment is the active time of the scheduled carrier of a terminal according to a first DRX group to which a scheduling carrier of the terminal belongs.

In the example of this application, the active time of the scheduled carrier may be understood as the active time of the DRX group to which the scheduled carrier belongs. The active time of the scheduling carrier can be understood as the active time of the DRX group to which the scheduling carrier belongs.

In this application, the carrier frequencies of the scheduled carrier and the scheduling carrier are different. The scheduling information of the scheduled carrier can be transmitted on the scheduling carrier, so it is called the scheduling carrier. The scheduling information of the scheduled carrier may include time domain resources for the terminal to use the scheduled carrier, etc.

The method provided in the example may be applied in various communication devices, for example, terminals or base stations. When the method is applied to a terminal, the functional structure corresponding to the scheduled carrier in the terminal will be activated after the current moment is determined by the terminal as the active time of the scheduled carrier, so that the corresponding functional structure will exit the sleep state and enter the active state. After entering the active state, the terminal can monitor the information sent on the scheduled carrier and/or send information using the scheduled carrier. If the current moment is not the active time of the scheduled carrier, the functional structure corresponding to the scheduled carrier will not be activated in the terminal at the current moment, i.e., the functional structure corresponding to the scheduled carrier will be in the sleep state.

The functional structure may include: a transceiver within the terminal, e.g., a Radio Frequency Chain (RF chain). For example, information transmitted on the scheduling carrier is sent and received using a first transceiver, and information on the scheduled carrier is sent and received using a second transceiver. The first transceiver and the second transceiver may be different.

Further, the functional structure may also include a Base band Processor (BP) within the terminal, etc. For example, a first BP is used for the scheduling carrier and a second BP is used for the scheduled carrier. The first BP may process the baseband signals for transmitting information on the scheduling carrier, and the second BP may process the baseband signals for transmitting information on the scheduled carrier.

When the method is applied to a base station, the base station determines that the currently scheduled carrier of the terminal is in the active time, and then the base station can transmit information on the scheduled carrier.

In the example of this application, the information transmitted on the scheduling carrier and the scheduled carrier includes at least one of uplink signaling, uplink data, downlink signaling, and downlink information.

If the terminal supports carrier aggregation, respective DRX groups can be set for the carriers on different RF chains. The DRX cycle corresponding to the DRX group may include the active time and sleep time. During the sleep time, the functional structure corresponding to the DRX group is in a sleep state, and in the sleep state, the power consumption of the functional structure is less than that in the active state. The functional structure corresponding to the activation (corresponding to the active state) or de-activation (corresponding to the sleep state) is determined by different DRX groups, instead of activating or de-activating the whole terminal. On one hand, the independence of the terminal configured with multiple different DRX groups connected or disconnected from the base station is maintained, and the phenomenon that a single de-activation at the entire terminal granularity leads to a large delay in the transmission of terminal services is reduced. On the other hand, the phenomenon that a single de-activation at the entire terminal granularity leads to high terminal power consumption is reduced. Therefore, by the examples of the present application, the transmission delay of the terminal is reduced as a whole, and the low power consumption of the terminal is maintained, thereby ensuring the standby time of the terminal.

In some examples, the scheduled carrier is separately configured with a DRX group. In other examples, the scheduled carrier is not separately configured with a DRX group.

In some examples, if the scheduled carrier is not separately configured with a DRX group, the DRX group of the scheduling carrier can be defaulted to the DRX group of the scheduled carrier.

In other examples, if no DRX group is configured for the scheduled carrier, a specific DRX group pre-negotiated by the base station and the terminal or defined by the protocol can be defaulted to the DRX group of the scheduled carrier.

In the examples of this application, when the scheduled carrier is configured with a DRX group, the DRX group is referred to as a second DRX group.

When the current moment is determined to be the active time of the scheduled carrier, the second DRX group of the terminal will exit the sleep state and enter the active state, and after the scheduled carrier enters the active state, the terminal may monitor the Physical Downlink Control Chanel (PDCCH) of the scheduled carrier corresponding the scheduled carrier, or monitor the Physical Downlink Shared Channel (PDSCH) of the scheduled carrier corresponding to the second DRX group. For example, the terminal receives the signaling carried on the PDCCH by monitoring the PDCCH on the scheduled carrier; the terminal receives the downlink data carried on the PDSCH by monitoring the PDSCH on the scheduled carrier. The signaling carried on the PDCCH includes downlink control information.

If the terminal supports carrier aggregation, it can access to different cells through multiple carriers. In some cases, the multiple cells to which the terminal is connected are divided into a primary cell and a secondary cell. The primary cell may be a scheduling cell for the secondary cell. The secondary cell can assist the primary cell to send downlink data to the terminal or receive uplink data from the terminal while the primary cell is providing services to the terminal. In this case, the scheduling carrier is the carrier of the primary cell, and the scheduled carrier is the carrier of the secondary cell.

In the examples of this application, in order to further save the power consumption of the terminal, the active time of the scheduled carrier is determined based on the first DRX group of the scheduling carrier, instead of being determined directly by the DRX configuration of the scheduling carrier or the activation trigger event of the scheduled carrier individually, so that the unnecessary activation of the scheduled carrier in the case of cross-carrier scheduling can be further reduced, further saving the power consumption of the terminal and extending the standby time of the terminal.

In the examples of this application, the active time of the scheduling carrier may be determined according to the first DRX configuration of the first DRX group, or based on the trigger of the activation trigger event.

The DRX configuration of the first DRX group and the second DRX group may include any configuration of the DRX cycle, for example, a configuration of the activation timer for timing the active time within the DRX cycle, and a configuration of the de-activation timer for timing the sleep time within the DRX cycle.

In the case that the scheduled carrier is configured with a DRX group, i.e., the scheduled carrier is separately configured with a second DRX group, there are two cases of association between the second DRX group and the first DRX group, one is that the second DRX group and the first DRX group are the same, and the other is that the second DRX group and the first DRX group are different.

In the case where the second DRX group and the first DRX group are the same, according to the second DRX configuration of the second DRX group and the first DRX configuration of the first DRX group, the active time of the scheduled carrier is the same as the active time of the scheduling carrier. In this case, when determining whether the current moment is the active time of the scheduled carrier according to the DRX configuration alone, the determining is based on the first DRX configuration or the second DRX configuration since the first DRX group and the second DRX group are the same. In some examples, if the current load of the scheduling carrier is small, the scheduled carrier is in a sleep state (i.e., the current moment is not the active time of the scheduled carrier), when the first DRX group and the second DRX group are the same and in the absence of activation trigger event.

The scenario of determining whether the current moment is the active time of the scheduled carrier according to the DRX configuration alone includes, but is not limited to: the scenario of determining whether the current moment is the active time of the scheduled carrier according to the DRX configuration alone in the absence of the activation trigger event.

This activation trigger event includes, but is not limited to, at least one of: a resource scheduling event in which a resource scheduling request is sent on the scheduled carrier and is pending for a reply, and a data wait event in which a contention free random access request is initiated on the scheduled carrier, a random access response is received, and then data is awaited.

As shown in FIG. 4, in the method for determining active time of the scheduled carrier, whether the scheduled carrier is configured with a DRX group may be determined in advance, and depending on whether the scheduled carrier is configured with a DRX group, whether the current moment is the active time of the scheduled carrier may be determined based on the first DRX group, respectively.

For example, S110, i.e., determining, in a cross-carrier scheduling scenario, whether the current moment is the active time of the scheduled carrier of the terminal according to the first DRX group to which the scheduling carrier of the terminal belongs, may include S111, i.e., determining, in response to the scheduled carrier being configured with a second DRX group, whether the current moment is the active time of the scheduled carrier according to the first DRX group and the second DRX group.

In the example of this application, if the scheduled carrier is separately configured with the second DRX, the first DRX group and the second DRX group are combined to determine whether the current moment is the active time of the scheduled carrier, instead of determining whether the current moment is the active time of the scheduled carrier based on the second DRX group alone. In this way, the PDCCH signaling that is scheduled to be sent by the scheduled carrier is sent by the scheduling carrier as much as possible when the scheduling carrier is active in the cross-carrier scheduling scenario. The PDCCH signaling here includes, but is not limited to, DCI. Therefore, the time when the scheduled carrier is active is reduced, the power consumption of the terminal is reduced, and the standby time of the terminal is extended.

The first DRX group is provided with a first DRX configuration, and the second DRX group is provided with a second DRX configuration.

S111, i.e., determining, in response to the scheduled carrier being configured with a second DRX group, whether the current moment is the active time of the scheduled carrier according to the first DRX group and the second DRX group, may include one of the following: determining, in response to the first DRX group and the second DRX group being different, whether the current moment is the active time of the scheduled carrier according to an intersection of active time of the first DRX configuration and active time of the second DRX configuration; and determining, in response to the first DRX group and the second DRX group being different, whether the current moment is the active time of the scheduled carrier according to the active time of the first DRX configuration.

The DRX groups of the scheduling carrier and the scheduled carrier of the terminal are different, and the two DRX groups correspond to their respective DRX configurations, which may include, for example, timing configurations for one or more of the following timers: the DRX activation timer (drx-onDurationTimer), DRX de-activation timer (drx-InactivityTimer), DRX downlink retransmission timer (drx-RetransmissionTimerDL) and DRX uplink retransmission timer (drx-RetransmissionTimerUL).

These DRX groups are active while these timers are in the timing state.

In the absence of a trigger event, if the activate time of the scheduling carrier and/or the scheduled carrier is determined in accordance with the DRX configuration alone, considering the case of the cross-carrier scheduling, the activate time of each of the two DRX configurations will be determined first according to the first DRX configuration and the second DRX configuration when the first DRX group and the second DRX group are different in this application. If the two active times have an intersection in the time domain, the intersection is used to determine whether the current moment is the active time of the scheduled carrier according to this intersection. For example, if the current moment is within the intersection, the current moment is the activate time of the scheduled carrier. If the current moment is not within the intersection, the current moment is not the active time of the scheduled carrier.

If the two active times determined according to the first DRX configuration and the second DRX configuration do not intersect, the active time of the scheduled carrier can be determined according to the first DRX configuration alone, or according to the second DRX configuration alone.

In other examples, even if there is an intersection between the active time of the first DRX configuration and the active time of the second DRX configuration, the active time of the scheduled carrier may still be determined based on the first DRX configuration alone or based on the second DRX configuration alone.

For example, S111, i.e., determining whether the current moment is the active time of the scheduled carrier according to the active time of the first DRX configuration, may include: determining, in response to the current moment is the active time of the first DRX configuration, that the current moment is the active time of the scheduled carrier; and determining, in response to the current moment is not the active time of the first DRX configuration, that the current moment is not the activate time of the scheduled carrier.

Figure 5:
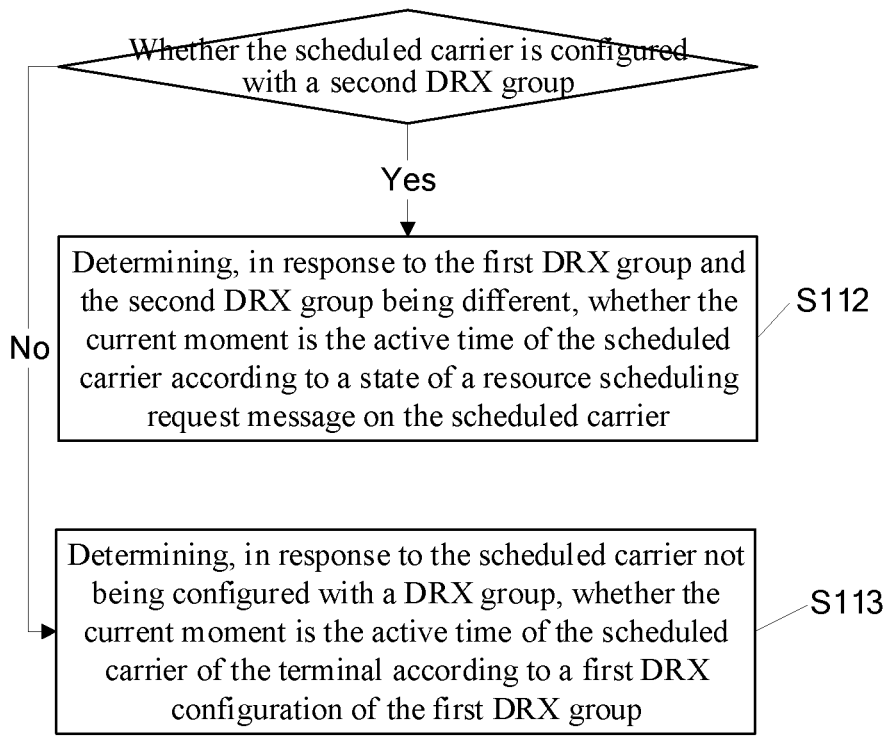
FIG. 5 illustrates a flow diagram of a method for determining active time of a scheduled carrier provided by one or more examples of the present application.

As shown in FIG. 5, in this example, S110 may include S112, i.e., determining, in response to the first DRX group and the second DRX group being different, whether the current moment is the active time of the scheduled carrier according to a state of a resource scheduling request message on the scheduled carrier.

For example, in the case where the terminal needs to use the scheduled carrier to transmit information, the first DRX group and the second DRX group are different, and there is a resource scheduling request message on the scheduled carrier (e.g., a scheduling request message sent by the terminal via the scheduling carrier), the state of the resource scheduling request message includes a state that the terminal is waiting for a resource scheduling response from the scheduled carrier, etc.

Furthermore, the state of the resource scheduling request message on the scheduled carrier includes an active state in the activation trigger event that actives the scheduled carrier.

If the current state of the resource scheduling request message on the scheduled carrier is the active state included in the activation trigger event, the current moment is determined to be the active time of the scheduled carrier, and if the current state of the resource scheduling request message on the scheduled carrier is not the active state included in the activation trigger event, the current moment is determined to be not the active time of the scheduled carrier. Of course, this is only an example of how to determine whether the current moment is the active time of the scheduled carrier based on the state of the resource scheduling request message on the scheduled carrier, and the specific implementation is not limited to this.

In some examples, in the case where the current moment is determined to be the active time of the scheduled carrier according to the state of the resource scheduling request message on the scheduled carrier, when the state ends and enters a state not included in the activation trigger event or enters a pre-configured active state, the second DRX group of the terminal exits the active state, i.e., ends the active time and enters the sleep state to save power consumption of the terminal.

In some examples, S112, i.e., determining, in response to the first DRX group and the second DRX group being different, whether the current moment is the active time of the scheduled carrier according to a state of a resource scheduling request message on the scheduled carrier, may include one of the following steps:

determining that the current moment is the active time of the scheduled carrier upon a reply to a pending resource scheduling request message on the scheduled carrier, where the state of the resource scheduling request message pending for the reply on the scheduled carrier is further configured to determine that the current moment is active time of the scheduling carrier;

determining that the current moment is not the active time of the scheduled carrier upon the reply to the pending resource scheduling request message on the scheduled carrier, where the state of the resource scheduling request message pending for the reply on the scheduled carrier is configured to determine that the current moment is the active time of the scheduling carrier; and determining that the current moment is the active time of the scheduled carrier upon the reply to the pending resource scheduling request message on the scheduled carrier, where the state of the resource scheduling request message pending for the reply on the scheduled carrier is not configured to determine that the current moment is the active time of the scheduling carrier.

The resource scheduling request message on the scheduled resource is pending for a reply, where the reply is directed to the resource scheduling request message. The replay may be a scheduling acknowledgment instruction and/or a scheduling rejection instruction for resource scheduling. The scheduling acknowledgment instruction(s) may include, but is not limited to, an uplink scheduling instruction and/or a downlink scheduling instruction. The uplink scheduling instruction may be used to schedule an uplink transmission on the scheduled carrier. The downlink scheduling instruction may be used to schedule a downlink transmission on the scheduled carrier.

In the cross-carrier scheduling scenario, the scheduling information of the scheduled carrier may be transmitted on the scheduling carrier, or it may be transmitted by the scheduled carrier itself according to the self-set load of the scheduling carrier. Therefore, in the examples of this application, whether the first DRX group and the second DRX group are active at the current moment can be determined respectively according to the specific application scenario.

For example, the reply corresponding to the scheduling request message (i.e., the scheduling information) is transmitted by the scheduling carrier, then the current moment is not the active time of the scheduled carrier, but is the active time of the scheduling carrier, so that the functional structure corresponding to the first DRX group can be used to receive the scheduling information. The active time of the second DRX group may be determined according to the configuration corresponding to the second DRX group itself, or the second group may be activated at the active time indicated by the scheduling information to transmit the data corresponding to the scheduling information.

For another example, in some examples, the reply corresponding to the scheduling request message (i.e., the scheduling information) is transmitted by the scheduling carrier, and the scheduled resource is used for emergency service transmission, etc. In this case, the current moment is the active time of the scheduling carrier, and is also the active time of the scheduled carrier. Due to the emergency service transmission, the time domain resource corresponding to the scheduled resource will be close to the delivery time of the scheduling information, so in order to realize the timely transmission of the emergency service, the current moment can be used as the active time of the scheduling carrier to receive the scheduling information and can also be used as the active time of the scheduled carrier to maintain the functional structure of the second DRX group in the active state, so that once the start moment of the scheduled resource is reached in the time domain to start transmitting data immediately. The emergency service includes, but is not limited to, the Ultra Reliable Low Latency Communications (URLLC) service.

For yet another example, in some examples, the reply corresponding to the scheduling request message (i.e., the scheduling information) is transmitted by the scheduled carrier itself, and then the current moment of the second DRX group is determined to be the active time. Further, whether the current moment is the active time of the first DRX group depends on the first DRX configuration and/or activation trigger event of the first DRX group itself.

Therefore, in some examples, S112 may include determining that the current moment is the active time of the scheduled carrier upon the reply to the pending resource scheduling request message on the scheduled carrier, where the current time is not the active time of the scheduling carrier.

In some examples, S110, i.e., determining, in a cross-carrier scheduling scenario, whether the current moment is the active time of the scheduled carrier of the terminal according to the first DRX group to which the scheduling carrier of the terminal belongs, may further include: determining, in response to the first DRX group and the second DRX group being different, whether the current moment is the active time of the scheduled carrier according to a state of a contention free random access on the scheduled carrier.

In some examples, the terminal will initiate random access based on the random access resources of the contention free random access. If the contention free random access is successful, the terminal will enter the active state for data transmission. However, if the contention free random access fails, for the purpose of saving terminal power consumption, the DRX group corresponding to the terminal may stay in the sleep state, and wait for the next random access time to enter the active state to initiate random access.

Therefore, in some examples, the above step, i.e., determining, in response to the first DRX group and the second DRX group being different, whether the current moment is the active time of the scheduled carrier according to a state of a contention free random access on the scheduled carrier, may include one of the following steps:

determining that the current moment is the active time of the scheduled carrier according to the state of waiting for data after a successful contention free random access on the scheduled carrier, where the state of waiting for data after the successful contention free random access on the scheduled carrier is further configured to determine that the current moment is active time of the scheduling carrier;

determining that the current moment is not the active time of the scheduled carrier according to the state of waiting for data after the successful contention free random access on the scheduled carrier, where the state of waiting for data after the successful contention free random access on the scheduled carrier is configured to determine that the current moment is the active time of the scheduling carrier; and determining that the current moment is the active time of the scheduled carrier according to the state of waiting for data after the successful contention free random access on the scheduled carrier, where the state of waiting for data after the successful contention free random access on the scheduled carrier is not configured to determine that the current moment is the active time of the scheduling carrier.

In some examples, if the scheduling carrier corresponding to the first DRX group is currently idle or the load of the scheduling carrier is relatively small, and the scheduled carrier of the second DRX group may not be used for data transmission, the current moment may be considered as not the active time of the second DRX group, but only as the active time of the scheduling carrier.

In some other examples, if the scheduling carrier corresponding to the first DRX group is currently idle or the load of the scheduling carrier is relatively large or the signal quality of the scheduling carrier is poor and other situations where it is not appropriate to use the scheduling carrier for data transmission, the current moment may be determined to be the active time of the scheduled carrier. Further, whether the current moment is the active time of the scheduling carrier may be independently determined by the first DRX configuration and/or activation trigger event of the first DRX group.

In some other examples, S110, i.e., determining, in a cross-carrier scheduling scenario, whether the current moment is the active time of the scheduled carrier of the terminal according to the first DRX group to which the scheduling carrier of the terminal belongs, may include determining, in response to the first DRX group and the second DRX group being different, whether the current moment is the active time of the scheduled carrier according to a startup state of an inactivity timer triggered by a grant for new data transmitted on the scheduled carrier.

For example, the method is applied to a terminal that receives a grant from a base station to start an inactivity timer for new data transmitted on a scheduled carrier. For example, after the terminal receives on the scheduling carrier a grant for the new data transmitted on the scheduled carrier, the inactivity timer of the terminal starts according to the grant. The grant for the new transmitted data may be carried in the PDCCH signaling for the PDCCH transmission.

If the method is applied in the base station, the base station may determine the startup state of the corresponding inactivity timer based on its own configurations of the grant for the new data transmitted on the scheduled carrier and the inactivity timer, and determine whether the current moment is the active time of the scheduled carrier.

In some examples, the determining whether the current moment is the active time of the scheduled carrier according to the startup state of the inactivity timer triggered by the grant for the new data transmitted on the scheduled carrier, includes one of the following steps:

determining that the current moment is the active time of the scheduled carrier upon a start of the inactivity timer triggered by the grant for the new data transmitted on the scheduled carrier, where the start of the inactivity timer triggered by the grant for the new data transmitted on the scheduled carrier is further configured to determine that the current moment is active time of the scheduling carrier;

determining that the current moment is not the active time of the scheduled carrier upon the start of the inactivity timer triggered by the grant for the new data transmitted on the scheduled carrier, where the start of the inactivity timer triggered by the grant for the new data transmitted on the scheduled carrier is configured to determine that the current moment is the active time of the scheduling carrier; and determining that the current moment is the active time of the scheduled carrier upon a start of the inactivity timer triggered by the grant for the new data transmitted on the scheduled carrier, where the start of the inactivity timer triggered by the grant for the new data transmitted on the scheduled carrier is not configured to determine that the current moment is the active time of the scheduling carrier.

In some examples, the method further includes: in response to the first DRX group and the second DRX group being different and no inactivity timer being started for the new data transmitted on the scheduled carrier, determining that the current moment is not the active time of the scheduled carrier; or in response to the first DRX group and the second DRX group being different and the inactivity timer triggered by the grant for the new data transmitted on the scheduled carrier having been not started, determining that the current moment is not the active time of the scheduled carrier.

In some examples, as shown in FIGS. 4 and 5, S110, i.e., determining, in a cross-carrier scheduling scenario, whether the current moment is the active time of the scheduled carrier of the terminal according to the first DRX group to which the scheduling carrier of the terminal belongs, may further include S113, i.e., determining, in response to the scheduled carrier not being configured with a DRX group, whether the current moment is the active time of the scheduled carrier of the terminal according to a first DRX configuration of the first DRX group.

In these examples, if the scheduled carrier is not configured with a DRX group, the terminal and the base station default the DRX group of the scheduled carrier is the same as the DRX group of the scheduling carrier, that is, the DRX group of the scheduled carrier is also the first DRX group. Therefore, in this case, the first DRX configuration of the first DRX group is directly used to determine whether the current moment is the active time of the scheduled carrier. If the current moment is within the active time of the first DRX configuration, it is determined that the current moment is the active time of the scheduled carrier. If the current moment is not within the active time of the first DXR configuration, it is determined that the current moment is not the active time of the scheduled carrier.

Specifically, S113 may include: determining, based on a protocol, pre-negotiation, or signaling issued by a base station, whether the current moment is the active time of the scheduled carrier of the terminal according to the first DRX configuration of the first DRX group.

In the communication protocol of the communication equipment, it can be agreed that if the scheduled carrier is not configured with a DRX group, the scheduled carrier and its scheduling carrier belong to the same DRX group. In this way, the terminal and the base station can determine whether the current moment is the active time of the scheduled carrier directly according to the communication protocol when determining the active time of the scheduled carrier.

In other examples, if the base station has not configured the DRX group of the scheduled carrier for the terminal, the base station and the terminal may interact with each other through one or more signaling interactions, which is equivalent to sharing a DRX group between the scheduled carrier and the scheduling carrier.

If the base station determines the DRX group of the schedule carrier separately, the base station may indicate to the terminal that the DRX group of the scheduling carrier is shared with the scheduled carrier through the signaling issued by the base station. Alternatively, the base station may determine the DRX group of the scheduled carrier of the terminal based on the signaling issued by itself.

The signaling from the base station can at least indicate that the scheduling carrier and the scheduled carrier belong to the same DRX group.

In some examples, the method further includes: determining, in response to the scheduled carrier not being configured with a DRX group, that the scheduled carrier and the scheduling carrier belong to a same DRX group.

In these examples, determining, in response to the scheduled carrier not being configured with the DRX group, that the scheduled carrier belongs to the first DRX group, includes: determining, in response to the scheduled carrier not being configured with the DRX group, that the scheduled carrier and the scheduling carrier belong to the same DRX group based on a protocol, pre-negotiation, or signaling issued by a base station.

In summary, in the examples provided by this application, in the cross-carrier scheduling scenario, the DRX group to which the secondary cell belongs can be in the same group or in a different group from the DRX group to which the primary cell that schedules the secondary cell belongs.

A scenario in which the DRX group to which the secondary cell belongs can be in the same group as the group to which the primary cell that schedules the secondary cell belongs is that the DRX group to which the secondary cell belongs is determined by the DRX group to which the primary cell that schedules the secondary cell belongs.

In an example, the DRX group to which the secondary cell belongs determined by the DRX group to which the primary cell that schedules the secondary cell belongs may be based on protocol provisions.

The mechanism of working in the scenario where the DRX group to which the secondary cell belongs and the DRX group to which the primary cell that schedules the secondary cell belongs are in different DRX groups can be as follows.

In an example, the active time at which the secondary cell monitors the active state of the PDCCH is the intersection of the active time of the DRX group to which the secondary cell belongs and the active time of the DRX group to which the primary cell that schedules the secondary cell belongs. In an example, the active time at which the secondary cell monitors the active state of the PDCCH is the active time of the DRX group to which the primary cell that schedules the secondary cell belongs.

In the scenario where the DRX group to which the secondary cell belongs and the DRX group to which the primary cell that schedules the secondary cell belongs are in different DRX groups, the working mechanism of the resource scheduling request message pending (SR pending) for a reply may be as follows.

In one example, the resource scheduling request message pending (SR pending) for a reply on the secondary cell may cause the DRX group to which the secondary cell belongs to enter the active state, and may also cause the DRX group to which the primary cell that schedules the secondary cell belongs to be active.

In one example, the resource scheduling request message pending (SR pending) for a reply on the secondary cell may only cause the DRX group to which the primary cell that schedules the secondary cell belongs to be active.

In one example, the resource scheduling request message pending (SR pending) for a reply on the secondary cell may only cause the DRX group to which the secondary cell belongs to enter the active state.

In the scenario where the DRX group to which the secondary cell belongs and the DRX group to which the primary cell that schedules the secondary cell belongs are in different DRX groups, the working mechanism of the contention free random access (CFRA) on the secondary cell waiting for the subsequent data to enter the active state after receiving the Random Access Preamble (RAR) may be as follows.

In one example, the CFRA on the secondary cell receives the RAR and waits for subsequent data to enter the active state which may cause the DRX group to which the secondary cell belongs to enter the active state, and may also cause the DRX group to which the primary cell that schedules the secondary cell belongs to be active.

In one example, the CFRA on the secondary cell receives the RAR and waits for subsequent data to enter the active state which may only cause the DRX group to which the primary cell that schedules the secondary cell belongs to be active.

In one example, the CFRA on the secondary cell receives the RAR and waits for subsequent data to enter the active state which may only cause the DRX group to which the secondary cell belongs to enter the active state.

Figure 6:
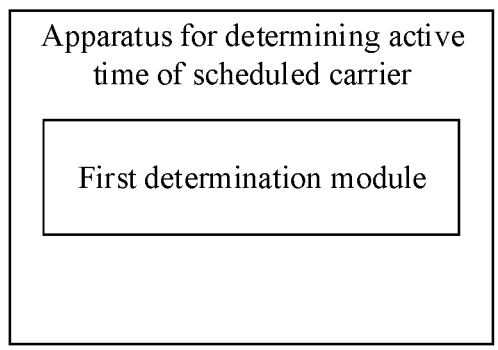
FIG. 6 illustrates a structural schematic diagram of an apparatus for determining active time of a scheduled carrier provided by embodiments of the present application.

As shown in FIG. 6, there is provided an apparatus for determining active time of a scheduled carrier by the examples of this application, which includes a first determination module configured to determine, in a cross-carrier scheduling scenario, whether a current moment is the active time of the scheduled carrier of a terminal according to a first Discontinuous Reception (DRX) group to which a scheduling carrier of the terminal belongs.

In some examples, the first determination module may be a program module that, when executed by the processor, enables the determination of whether the current moment is the active time of the scheduled carrier.

In some examples, the first determination module may be a hard and soft combination module that includes, but is not limited to, a programmable array. The programmable array includes, but is not limited to, a complex programmable array or a field programmable array.

In some other examples, the first determination module may be a pure hardware module which may include a dedicated integrated circuit.

In some examples, the first determination module is configured to determine, in response to the scheduled carrier being configured with a second DRX group, whether the current moment is the active time of the scheduled carrier according to the first DRX group and the second DRX group.

In some examples, the first DRX group is provided with a first DRX configuration and the second DRX group is provided with a second DRX configuration; and the first determination module is configured to perform one of following acts: determining, in response to the first DRX group and the second DRX group being different, whether the current moment is the active time of the scheduled carrier according to an intersection of active time of the first DRX configuration and active time of the second DRX configuration; and determining, in response to the first DRX group and the second DRX group being different, whether the current moment is the active time of the scheduled carrier according to the active time of the first DRX configuration.

In some examples, the first determination module is configured to determine, in response to the first DRX group and the second DRX group being different, whether the current moment is the active time of the scheduled carrier according to a state of a resource scheduling request message on the scheduled carrier.

In some examples, the first determination module is configured to perform one of following acts: determining that the current moment is the active time of the scheduled carrier upon a reply to a pending resource scheduling request message on the scheduled carrier, wherein the state of the resource scheduling request message pending for the reply on the scheduled carrier is further configured to determine that the current moment is active time of the scheduling carrier; determining that the current moment is not the active time of the scheduled carrier upon the reply to the pending resource scheduling request message on the scheduled carrier, wherein the state of the resource scheduling request message pending for the reply on the scheduled carrier is configured to determine that the current moment is the active time of the scheduling carrier; and determining that the current moment is the active time of the scheduled carrier upon the reply to the pending resource scheduling request message on the scheduled carrier, wherein the state of the resource scheduling request message pending for the reply on the scheduled carrier is not configured to determine that the current moment is the active time of the scheduling carrier.

In some examples, the first determination module is configured to determine, in response to the first DRX group and the second DRX group being different, whether the current moment is the active time of the scheduled carrier according to a state of a contention free random access on the scheduled carrier.

In some examples, the first determination module is configured to perform one of following acts: determining that the current moment is the active time of the scheduled carrier according to the state of waiting for data after a successful contention free random access on the scheduled carrier, wherein the state of waiting for data after the successful contention free random access on the scheduled carrier is further configured to determine that the current moment is active time of the scheduling carrier; determining that the current moment is not the active time of the scheduled carrier according to the state of waiting for data after the successful contention free random access on the scheduled carrier, wherein the state of waiting for data after the successful contention free random access on the scheduled carrier is configured to determine that the current moment is the active time of the scheduling carrier; and determining that the current moment is the active time of the scheduled carrier according to the state of waiting for data after the successful contention free random access on the scheduled carrier, wherein the state of waiting for data after the successful contention free random access on the scheduled carrier is not configured to determine that the current moment is the active time of the scheduling carrier.

In some examples, the first determination module is further configured to determine, in response to the first DRX group and the second DRX group being different, whether the current moment is the active time of the scheduled carrier according to a startup state of an inactivity timer triggered by a grant for new data transmitted on the scheduled carrier.

In some examples, the first determination module is configured to perform one of following acts: determining that the current moment is the active time of the scheduled carrier upon a start of the inactivity timer triggered by the grant for the new data transmitted on the scheduled carrier, wherein the start of the inactivity timer triggered by the grant for the new data transmitted on the scheduled carrier is further configured to determine that the current moment is active time of the scheduling carrier; determining that the current moment is not the active time of the scheduled carrier upon the start of the inactivity timer triggered by the grant for the new data transmitted on the scheduled carrier, wherein the start of the inactivity timer triggered by the grant for the new data transmitted on the scheduled carrier is configured to determine that the current moment is the active time of the scheduling carrier; and determining that the current moment is the active time of the scheduled carrier upon a start of the inactivity timer triggered by the grant for the new data transmitted on the scheduled carrier, wherein the start of the inactivity timer triggered by the grant for the new data transmitted on the scheduled carrier is not configured to determine that the current moment is the active time of the scheduling carrier.

In some examples, the first determination module is further configured to determine, in response to the scheduled carrier not being configured with a DRX group, whether the current moment is the active time of the scheduled carrier of the terminal according to a first DRX configuration of the first DRX group.

In some examples, the first determination module is configured to determine, based on a protocol, pre-negotiation, or signaling issued by a base station, whether the current moment is the active time of the scheduled carrier of the terminal according to the first DRX configuration of the first DRX group.

Figure 7:
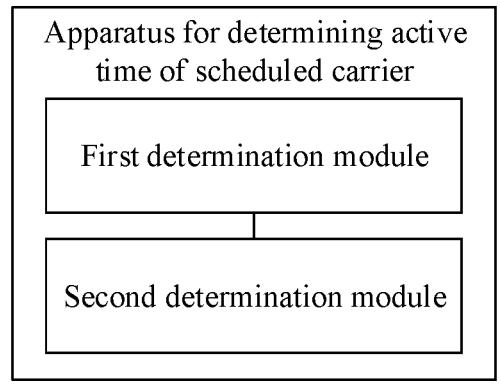
FIG. 7 illustrates a structural schematic diagram of an apparatus for determining active time of a scheduled carrier provided by one or more examples of the present application.

In some examples, as shown in FIG. 7, the apparatus further includes a second determination module configured to determine, in response to the scheduled carrier not being configured with a DRX group, that the scheduled carrier and the scheduling carrier belong to a same DRX group.

In some examples, the second determination module is configured to determine, in response to the scheduled carrier not being configured with the DRX group, that the scheduled carrier and the scheduling carrier belong to the same DRX group based on a protocol, pre-negotiation, or signaling issued by a base station.

Figure 8:
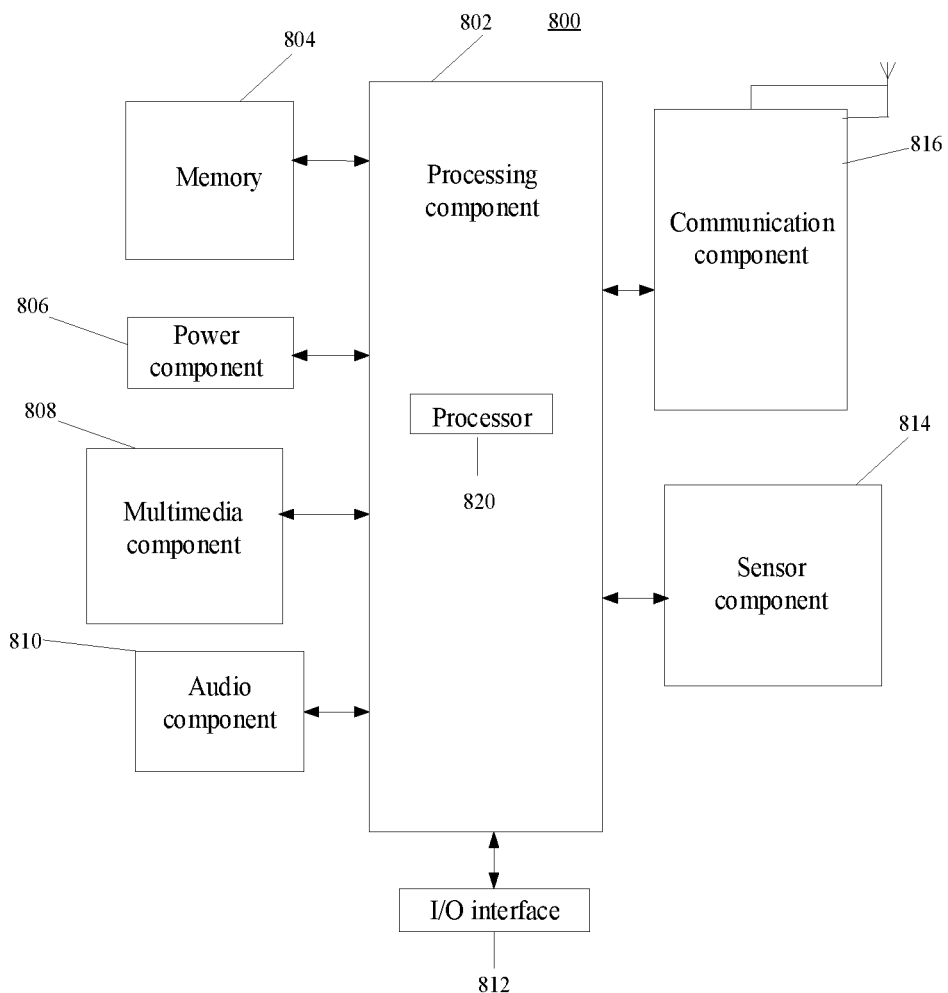
FIG. 8 illustrates a structural schematic diagram of a terminal provided by one or more examples of the present application.

FIG. 8 illustrates a terminal according to an example. Specifically, the terminal may be a cell phone, a computer, a digital broadcasting terminal, a messaging device, a game console, a tablet device, a medical device, a fitness device, a personal digital assistant, etc.

Referring to FIG. 8, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls the overall operation of the device 800, such as operations associated with display, phone call, data communication, camera operation, and recording operations. The processing component 802 may include one or more processors 820 to execute instructions to complete all or some of the steps of the method described above. In addition, the processing component 802 may include one or more modules that facilitate interaction between processing component 802 and other components. For example, processing component 802 may include a multimedia module to facilitate interaction between multimedia component 808 and processing component 802.

The memory 804 is configured to store various types of data to support operation at the electronic device 800. Examples of such data include instructions for any application or method of operation on the device 800, contact data, phonebook data, messages, images, videos, etc. The memory 804 can be implemented by any type of transitory or non-transitory storage device or a combination of them, such as static random access memory (SRAM), electrically erasable programmable read-only memory (EEPROM), erasable programmable read-only memory (EPROM), programmable read-only memory (PROM), read-only memory (ROM), magnetic memory, flash memory, disk or CD.

The power component 806 provides power to the various components of the terminal 800. The power component 806 may include a power management system, one or more power supplies, and other components associated with generating, managing, and distributing power for the terminal 800.

The multimedia component 808 includes a screen providing an output interface between the terminal 800 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense the boundaries of the touch or swipe action, but also detect the duration and pressure associated with the touch or swipe action. In some examples, the multimedia component 208 includes a front-facing camera and/or a rear-facing camera. The front camera and/or rear camera can receive external multimedia data when the device 800 is in an operating mode, such as shooting mode or video mode. Each front camera and rear camera may be a fixed optical lens system or have focal length and optical zoom capability.

The audio component 810 is configured to output and/or input audio signals. For example, the audio component 810 includes a microphone (MIC) configured to receive external audio signals when the terminal 800 is in an operating mode, such as call mode, recording mode, and voice recognition mode. The received audio signal may be further stored in memory 804 or sent via communication component 816. In some examples, the audio component 210 further includes a speaker for outputting audio signals.

The I/O interface 812 provides an interface between the processing component 802 and a peripheral interface module. The peripheral interface module may be a keyboard, click wheel, button, etc. These buttons may include, but are not limited to, a home button, a volume button, a start button, and a lock button.

The sensor component 814 includes one or more sensors for providing status assessment of various aspects of the terminal 800. For example, the sensor component 814 may detect an open/closed state of the device 800, the relative positioning of components, such as the components being the display and keypad of the terminal 800, the sensor component 814 may also detect a change in position of the terminal 800 or a component of the terminal 800, the presence or absence of user contact with the terminal 800, the orientation or acceleration/deceleration of the terminal 800 and temperature changes of the terminal 800. The sensor component 814 may include a proximity sensor configured to detect the presence of a nearby object in the absence of any physical contact. The sensor component 814 may also include a light sensor, such as a CMOS or CCD image sensor, for use in imaging applications. In some examples, the sensor component 814 may also include an accelerometer sensor, a gyroscope sensor, a magnetic sensor, a pressure sensor, or a temperature sensor.

The communication component 816 is configured to facilitate communication between the terminal 800 and other devices by wired or wireless means. The terminal 800 may access a wireless network based on a communication standard, such as 8WiFi, 2G, 3G, 4G, 5G, or a combination thereof. In one example, communication component 816 receives broadcast signals or broadcast-related information from an external broadcast management system via a broadcast channel. In an example, the communication component 816 further includes a near-field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In some examples, the terminal 800 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for performing above mentioned method for measuring the distance.

In some examples, there is also provided a non-transitory computer readable storage medium including instructions, such as the memory 804 including instructions, the instructions being executable by the processor 820 of the terminal 800 to accomplish the method described above. For example, the non-transitory computer readable storage medium may be ROM, random access memory (RAM), CD-ROM, magnetic tape, floppy disk, and optical data storage devices, among others.

Figure 9:
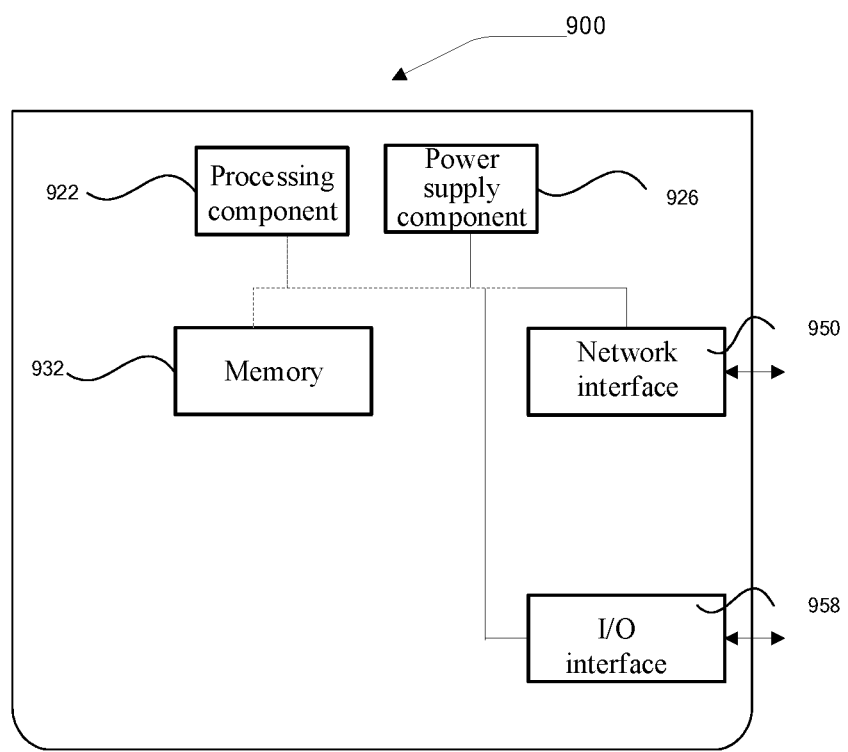
FIG. 9 illustrates a structural schematic diagram of a base station provided by one or more examples of the present application.

FIG. 9 is a schematic diagram of a base station. Referring to FIG. 9, the base station 900 includes a processing component 922, which further includes one or more processors, and memory resources represented by memory 932 for storing instructions, such as applications, that may be executed by the processing component 922. The application programs stored in memory 932 may include one or more modules each corresponding to a set of instructions. In addition, the processing component 922 is configured to execute the instructions to perform the method for determining the active time of the scheduled carriers as shown in any one of FIGS. 3-5.

The base station 900 may also include a power supply component 926 configured to perform power management of the base station 900, a wired or wireless network interface 950 configured to connect the base station 900 to a network, and an input-output (I/O) interface 958. The base station 900 may operate an operating system based on an operating system stored in memory 932, such as Windows Server™, Mac OS X™, Unix™, Linux™, FreeBSD™, or the like.

Examples of the present application provide a communication apparatus, which may be a terminal or a base station. The communication apparatus includes a transceiver; a memory; and a processor connected to the transceiver and the memory, respectively, configured to control the transceiver to send and receive wireless signals by executing computer-executable instructions stored on the memory, and capable of implementing the method for determining the active time of the scheduled carrier provided in any one of the preceding examples, for example, executing the method for determining the active time of the scheduled carrier as shown in any one of FIGS. 3-5.

The present application also provides a non-transitory computer-readable storage medium, the non-transitory computer-readable storage medium having computer-executable instructions stored thereon. The computer-executable instructions, when executed by a processor, are capable of implementing the method for determining the active time of the scheduled carrier provided by any of the preceding technical solutions, for example, at least one of the methods shown in at least one of FIG. 2, FIG. 4 and FIG. 5.

In the above examples of the present application, when a terminal is configured with multiple carriers, the carriers configured in the terminal are divided into the scheduling carrier and the scheduled carrier in a cross-carrier scheduling scenario. In the present application, the active time of the DRX cycle of the scheduled carrier is determined not only based on the configuration of the scheduled carrier itself, but also in combination with the DRX configuration of the scheduling carrier of the scheduled carrier, thus reducing the terminal power consumption caused by unnecessary activation of the scheduled carrier alone, reducing the power consumption overhead of the terminal, and extending the standby time of the terminal.

Other examples of the present disclosure will readily occur to those skilled in the art upon consideration of the specification and practice of the invention disclosed herein. This application is intended to cover any variations, uses, or adaptations of the present disclosure that follow the general principles of the present disclosure and include common knowledge or techniques in the technical field not disclosed by the present disclosure. The specification and examples are to be regarded as exemplary only, and the true scope and spirit of the disclosure being indicated by the following claims.

It should be understood that the present disclosure is not limited to the precise structures described above and illustrated in the accompanying drawings, and that various modifications and changes may be made without departing from the scope thereof. The scope of the present disclosure is limited only by the scope of the appended claims.

What is claimed is:

1. A method for determining active time of a scheduled carrier, comprising:
    determining, by a communication device in a cross-carrier scheduling scenario, whether a current moment is the active time of the scheduled carrier of a terminal according to a first Discontinuous Reception (DRX) group to which a scheduling carrier of the terminal belongs;
    wherein determining whether the current moment is the active time of the scheduled carrier of the terminal according to the first DRX group to which the scheduling carrier of the terminal belongs further comprises:
    determining, in response to the scheduled carrier being configured with a second DRX group, whether the current moment is the active time of the scheduled carrier according to the first DRX group and the second DRX group;
    wherein determining whether the current moment is the active time of the scheduled carrier according to the first DRX group and the second DRX group further comprises:
    determining, in response to the first DRX group and the second DRX group being different, whether the current moment is the active time of the scheduled carrier according to a state of a resource scheduling request message on the scheduled carrier; and
    wherein determining whether the current moment is the active time of the scheduled carrier according to the state of the resource scheduling request message on the scheduled carrier further comprises one of:
    determining that the current moment is the active time of the scheduled carrier upon a reply to a pending resource scheduling request message on the scheduled carrier, wherein the state of the resource scheduling request message pending for the reply on the scheduled carrier is further configured to determine that the current moment is active time of the scheduling carrier;
    determining that the current moment is not the active time of the scheduled carrier upon the reply to the pending resource scheduling request message on the scheduled carrier, wherein the state of the resource scheduling request message pending for the reply on the scheduled carrier is configured to determine that the current moment is the active time of the scheduling carrier; or
    determining that the current moment is the active time of the scheduled carrier upon the reply to the pending resource scheduling request message on the scheduled carrier, wherein the state of the resource scheduling request message pending for the reply on the scheduled carrier is not configured to determine that the current moment is the active time of the scheduling carrier.

2. The method of claim 1, wherein determining whether the current moment is the active time of the scheduled carrier of the terminal according to the first DRX group to which the scheduling carrier of the terminal belongs further comprises:
    determining, in response to the scheduled carrier not being configured with a DRX group, whether the current moment is the active time of the scheduled carrier of the terminal according to a first DRX configuration of the first DRX group.

3. The method of claim 2, wherein the determining whether the current moment is the active time of the scheduled carrier of the terminal according to the first DRX configuration of the first DRX group, comprises:
    determining, based on a protocol, pre-negotiation, or signaling issued by a base station, whether the current moment is the active time of the scheduled carrier of the terminal according to the first DRX configuration of the first DRX group.

4. The method of claim 1, further comprising:
    determining, in response to the scheduled carrier not being configured with a DRX group, that the scheduled carrier and the scheduling carrier belong to a same DRX group.

5. The method of claim 4, wherein determining, in response to the scheduled carrier not being configured with the DRX group, that the scheduled carrier belongs to the first DRX group, comprises:
    determining, in response to the scheduled carrier not being configured with the DRX group, that the scheduled carrier and the scheduling carrier belong to the same DRX group based on a protocol, pre-negotiation, or signaling issued by a base station.

6. A communication device, comprising:
a transceiver;
a memory; and
a processor connected to the transceiver and the memory, respectively, configured to control the transceiver to send and receive wireless signals by executing computer-executable instructions stored on the memory, and capable of implementing the method of claim 1.

7. The communication device of claim 6, wherein the processor is further configured to:
determine, in response to the scheduled carrier not being configured with a DRX group, whether the current moment is the active time of the scheduled carrier of the terminal according to a first DRX configuration of the first DRX group.

* * * * *